(12) United States Patent
Seto et al.

(10) Patent No.: US 9,039,052 B2
(45) Date of Patent: May 26, 2015

(54) MOLD STRUCTURE AND BUMPER

(75) Inventors: Hideyuki Seto, Miyoshi (JP); Shinichi Shimada, Toyota (JP); Shinichi Hanada, Toyota (JP); Akira Izumi, Toyota (JP); Sumio Sasaki, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/503,342

(22) PCT Filed: Oct. 18, 2010

(86) PCT No.: PCT/IB2010/002786
§ 371 (c)(1),
(2), (4) Date: Apr. 20, 2012

(87) PCT Pub. No.: WO2011/048487
PCT Pub. Date: Apr. 28, 2011

(65) Prior Publication Data
US 2012/0200097 A1  Aug. 9, 2012

(30) Foreign Application Priority Data

Oct. 21, 2009  (JP) ................. 2009-242766

(51) Int. Cl.
*B60R 19/02* (2006.01)
*B29C 33/44* (2006.01)
(Continued)

(52) U.S. Cl.
CPC ............. *B29C 33/44* (2013.01); *B29C 45/0025* (2013.01); *B29C 45/33* (2013.01); *B29C 45/44* (2013.01); *B29C 2045/0034* (2013.01);
(Continued)

(58) Field of Classification Search
CPC .................................. B60R 19/03; B60R 19/18
USPC .................................. 296/155; 293/155, 120
See application file for complete search history.

(56) References Cited

U.S. PATENT DOCUMENTS 2,891,283 A  6/1959  Cramer et al.
4,998,461 A  3/1991  Ishiwata et al.
(Continued)

FOREIGN PATENT DOCUMENTS

CN  1153720 A  7/1997
CN  101351321 A  1/2009
(Continued)

OTHER PUBLICATIONS

International Search Report and Written Opinion of PCT/IB2010/002786 mailed Oct. 2, 2011.
(Continued)

*Primary Examiner* — Glenn Dayoan
*Assistant Examiner* — Melissa A Black
(74) *Attorney, Agent, or Firm* — Kenyon & Kenyon LLP (57) ABSTRACT

A mold structure used to form a molded object having an undercut portion includes a fixed mold as a first mold having a first molding surface for molding an obverse surface of the molded object; a slide core having an undercut molding surface used to mold the undercut portion as part of the obverse surface of the molded object; and a movable mold as a second mold having a second molding surface used to mold the reverse surface of the molded object. The first molding surface and the undercut molding surface form a cavity surface. A step is formed between the first molding surface and the second molding surface at a parting position between the fixed mold and the slide core on the cavity surface.

2 Claims, 11 Drawing Sheets

(51) Int. Cl.
  *B29C 45/00* (2006.01)
  *B29C 45/33* (2006.01)
  *B29C 45/44* (2006.01)
  *B29C 45/17* (2006.01)
  *B29L 31/30* (2006.01)
  *B60R 19/18* (2006.01)

(52) U.S. Cl.
  CPC .. *B29L2031/3044* (2013.01); *B60R 2019/1886* (2013.01)

(56) References Cited

U.S. PATENT DOCUMENTS

| | | | |
|---|---|---|---|
| 6,068,807 | A | 5/2000 | Takeuchi et al. |
| 7,044,517 | B2 * | 5/2006 | Hyuga ................ 296/193.1 |
| 7,166,350 | B2 * | 1/2007 | Murayama ............... 428/131 |
| 8,349,240 | B2 * | 1/2013 | Smith ...................... 264/318 |
| 2008/0185863 | A1 * | 8/2008 | Kamano et al. ............. 296/70 |
| 2010/0040720 | A1 | 2/2010 | Nakagawa et al. |

FOREIGN PATENT DOCUMENTS

| | | |
|---|---|---|
| FR | 2 248 918 A1 | 5/1975 |
| JP | 62-207617 A | 9/1987 |
| JP | 06-064837 U | 9/1994 |
| JP | 10-058460 A | 3/1998 |
| JP | 2001-300996 A | 10/2001 |
| JP | 2002-192566 A | 7/2002 |
| JP | 2003-205536 A | 7/2003 |
| JP | 2004-160899 A | 6/2004 |
| JP | 2004-196122 A | 7/2004 |
| JP | 2005-178185 A | 7/2005 |
| JP | 2007-160703 A | 6/2007 |
| JP | 2009-226792 A | 10/2009 |

OTHER PUBLICATIONS

Office Action dated Oct. 21, 2011 of JP 2009-242766 and English translation thereof.
Z. Tang et al., "Guide for Plastic Article Designers," National Defense Industry Press, Sep. 1993, pp. 148-149. Includes partial English translation of Office Action (CN201080047591.8). From CN Office Action of Nov. 11, 2014.

* cited by examiner

MOLDED OBJECT

P/L PORTION

MOLD STRUCTURE AND BUMPER

This is a 371 national phase application of PCT/IB2010/002786 filed 18 Oct. 2010, claiming priority to Japanese Patent Application No. 2009-242766 filed 21 Oct. 2009, the contents of which are incorporated herein by reference.

BACKGROUND OF THE INVENTION

1. Field of the Invention

The invention relates to a mold structure and a bumper.

2. Description of the Related Art

Resin molded objects for vehicles, such as automobiles or the like, for example, bumpers or the like, are designed on the basis of a demand for high-quality vehicle body design in recent years, and hence may include undercut portions that extend in a direction that intersects with the release direction of a mold used to mold the molded object.

In addition to a fixed mold and a movable mold that are opened/closed vertically, a mold for molding a molded object having such an undercut portion may have a slide mold for molding the undercut portion and sliding in a direction intersecting with a mold opening direction to allow the molded object to be drawn out when the fixed mold and the movable mold are opened vertically. Due to the structure of the above mold, an protruding parting line (P/L=a mold parting line) is formed on the obverse surface of the molded object corresponding to, for example, the land between the fixed mold and the slide mold (a parting region of the mold).

A mold structure that prevents a parting line from appearing on the design surface of a bumper is described in, for example, Japanese Patent Application Publication No. 2003-205536 (JP-A-2003-205536).

That is, a mold structure that prevents a parting line from being formed on an outer surface of a bumper is described in Japanese Patent Application Publication No. 2003-205536 (JP-A-2003-205536). In the mold structure described in JP-A-2003-205536, the land between the mold and the slide mold is located on an outer surface of the flange portion of an injection-molded object. Specifically, the land between the mold and the slide mold is provided at a position that does not interfere with the exterior appearance. Therefore, the parting line does not appear in the vicinity of the flange portion exposed to the outside.

Furthermore, if the parting line appears on an exterior surface of the molded object, the molded object may be made aesthetically attractive by covering the parting line with another member to conceal it. For example, in Japanese Patent Application Publication No. 2004-196122 (JP-A-2004-196122), a structure is provided with a shade (a concealing member) to make the end of a front bumper invisible from a radiator grill.

A front bumper (see FIGS. 8A and 8B) having "horn portions" that protrude upward from the main body of the bumper to cover a space between a headlamp portion and an upper grill portion and a mold structure for molding the horn portions will be described in a view from a spot in front of a vehicle, as an example of the conventional approach to molding molded object that includes an undercut portion.

Figure 8A:
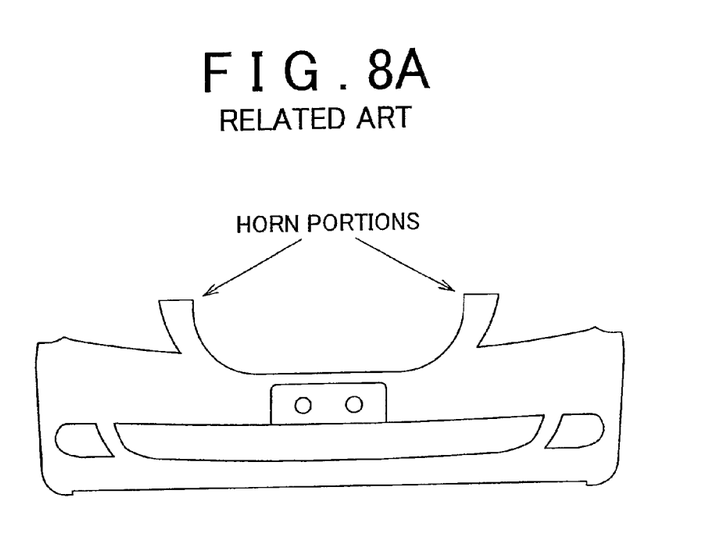
FIG. 8A is a front view of the front bumper and FIG. 8B is a perspective view of the front bumper.
Figure 8B:
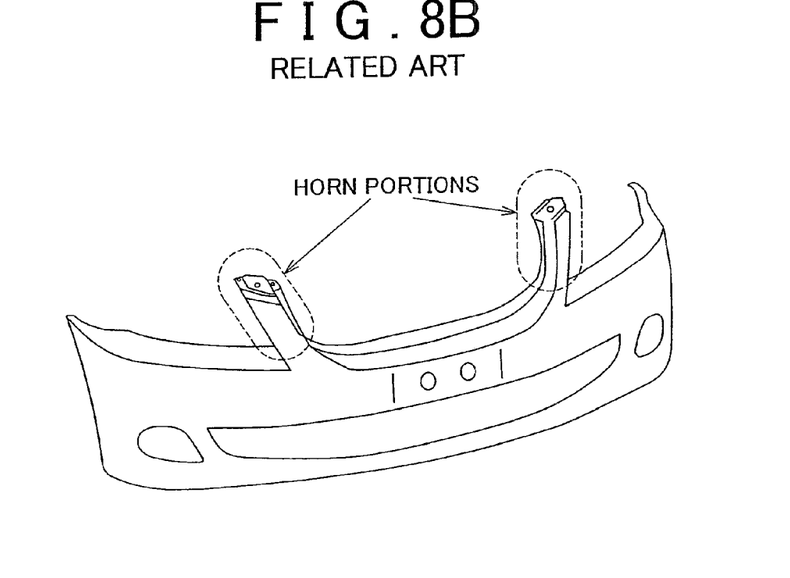
Figure 9:
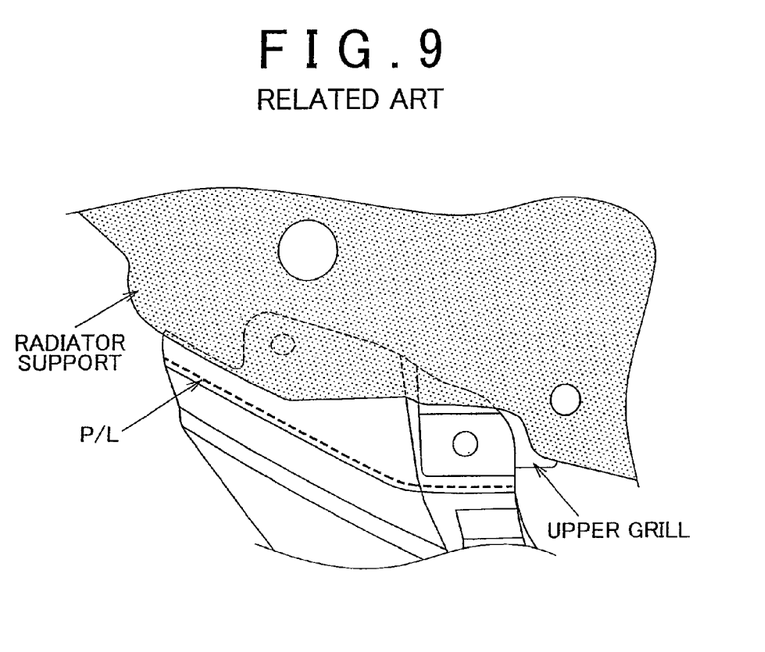
FIG. 9 is an illustrative view showing a horn portion mounting state and the position of a conventional parting line according to the related art.
Figure 12A:
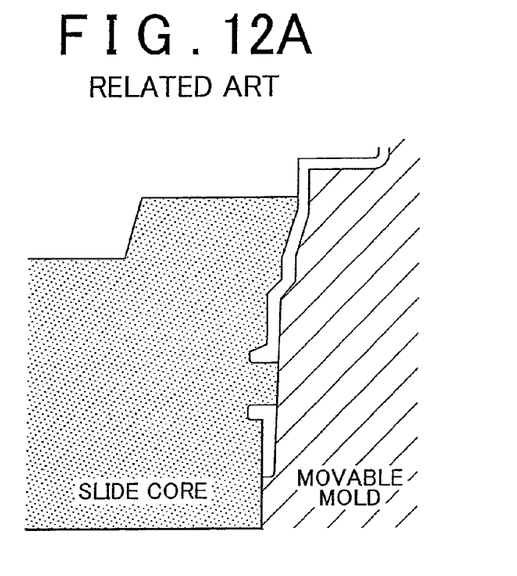
FIG. 12A shows the mold when clamped and FIG. 12B shows the mold when open.
Figure 12B:
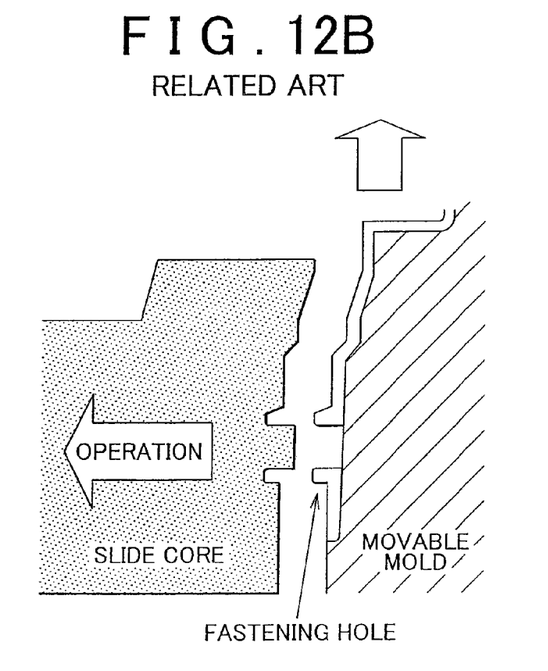

When the front bumper having the horn portions shown in FIGS. 8A and 8B is assembled with the vehicle, the assembly is carried out such that a tip of each of the horn portions is interposed between a radiator support and an upper grill as shown in FIG. 9. Further, the mold used in molding each of the horn portions of the bumper employs a slide core because a fastening hole (a through-hole) for assembly, which is formed by being opened through the tip of each of the horn portions, assumes an undercut shape as shown in FIG. 12.

In a mold structure employing such a slide core, a gap may be formed between the slide core and a fixed mold (at a parting position P shown in FIG. 11) due to a mold working error, displacement of the slide core resulting from an injection molding pressure, the creation of a clearance resulting from aging, etc.

Figure 10:
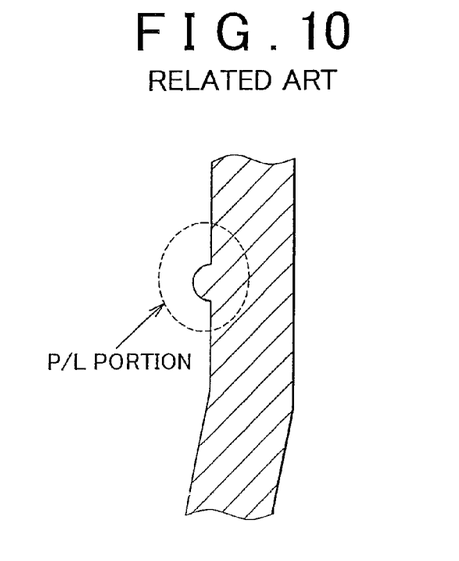
FIG. 10 is a cross-sectional view showing a parting line (P/L) noticeable on an obverse surface of a molded object according to the related art.
Figure 13:
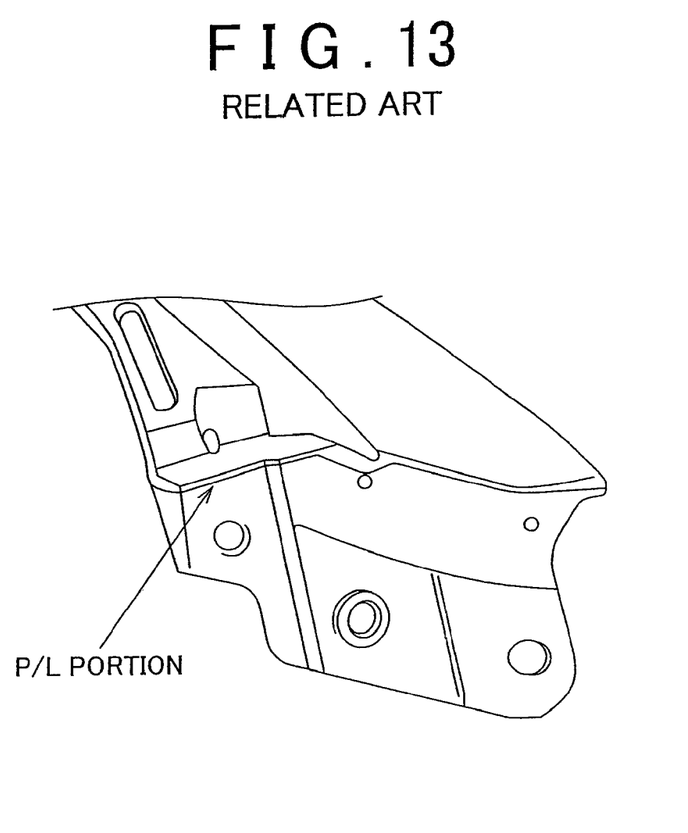
FIG. 13 is a perspective view showing a position of a parting line on each of the horn portions according to the related art.

The gap is formed because the surface of the molded object is molded using the fixed mold and the slide core which are split (separated) from each other, and the shape of a product or the mold structure does not make it possible to absorb a step resulting from the clearance created due to displacement or aging. In molding according to the mold structure thus having the fixed mold and the slide core, if a parting line as shown in FIG. 10 is noticeable (protruding linearly) and set at a visible position on the obverse surface of the molded object corresponding to the parting position P between the fixed mold and the slide core due to the aforementioned gap, the parting line is visible, for example, at a position shown in FIG. 9 or FIG. 13 at an end of each of the horn portions. As a result, a deterioration in aesthetic attractiveness may be caused when the front hood (bonnet) is open.

Figure 11:
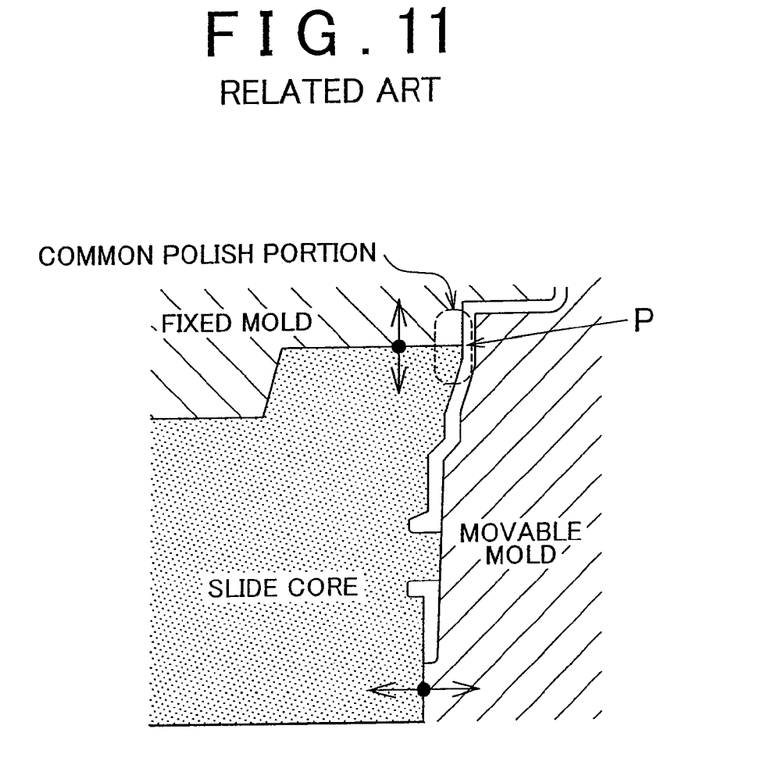
FIG. 11 is a cross-sectional view showing a part of a common polish portion of a conventional mold.

Thus, to manufacture a mold, in which the error/displacement during the working of the mold is minimized so that the parting line is less noticeable, a common polish operation for the slide core and the fixed mold for polishing a common polish portion as a peripheral portion of the parting position P between the fixed mold and the slide core shown in FIG. 11 is required. Consequently, the time required for maintenance and the cost of the mold have increased. It should be noted that if a gap is formed at the parting position P between the fixed mold and the slide core due to the aging of the mold, it is necessary to perform operations of "welding (deposit welding) a movable mold"→"mating the movable mold and the slide core with each other"→"commonly polishing the fixed mold and the slide core".

Thus, the technical elements in JP-A-2003-205536 and Japanese Patent Application Publication No. 2004-196122 (JP-A-2004-196122) may be applied to render the parting line on the molded object less noticeable. However, if art described in Japanese Patent Application Publication No. 2003-205536 (JP-A-2003-205536) is applied, the structural complexity of mold increases in the cost of the mold and a deterioration in the maintainability of the mold. In addition, because the bumper assumes a large variety of shapes in recent years, the parting line may not always be removable from a design surface when the bumper assumes a certain shape. Further, if the art described in Japanese Patent Application Publication No. 2004-196122 (JP-A-2004-196122) is applied, although the parting line may be concealed using a concealment member (a blinder member), the use of a concealment member increases the number of parts used, and accordingly, the production cost of the vehicle.

SUMMARY OF THE INVENTION

The invention provides a mold structure that molds an aesthetically attractive molded object by forming a parting line at an inconspicuous location on the exterior of the molded object, and a bumper.

A first aspect of the invention relates to a mold structure for molding a molded object having an undercut portion. The mold structure is equipped with a first mold having a first molding surface for molding an obverse surface of the molded object, a slide core having an undercut molding surface for molding the undercut portion as part of the obverse surface of the molded object, and a second mold having a second molding surface for molding a reverse surface of the molded object. The first molding surface and the undercut molding surface form a cavity surface. The first molding surface and the undercut molding surface have a step formed therebetween at a parting position between the first mold and the slide core on the cavity surface.

In above-described mold structure, the parting line is formed at an edge portion of the step on the molded object side by forming the step between the first molding surface and the undercut molding surface at the parting position between the first mold and the slide core on the cavity surface. Therefore, the parting line is inconspicuous on an exterior of the molded object. Further, the parting line is inconspicuous even when it appears. Therefore, there is no need to perform the common polish operation at the peripheral portion of the parting position as performed in the field of the related art. As a result, an improvement in operational safety is made, and the cost for manufacturing the mold can be reduced.

In the aforementioned construction, the step may be designed such that the slide core at the parting position protrudes more toward the second molding surface side than the first mold.

According to the aforementioned construction, the step on the obverse surface of the molded object formed by the step is concave. Therefore, even when a matching component becomes contiguous to this concave step, they do not interfere with each other.

A second aspect of the invention relates to a bumper mounted by being engaged with a matching component. This bumper has a step formed at a predetermined position of an obverse surface of the bumper, the step having a parting line along an edge region thereof.

According to the aforementioned construction, the parting line extends along the edge region of the step and hence appears inconspicuous.

In the aforementioned construction, the parting line may be set at such a position as to be concealed by the matching component when the matching component is engaged.

According to the aforementioned construction, the parting line can be concealed with the aid of the matching component. Therefore, no blinder member is required.

BRIEF DESCRIPTION OF THE DRAWINGS

The foregoing and further features and advantages of the invention will become apparent from the following description of an example embodiment of the invention with reference to the accompanying drawings, wherein like numerals are used to represent like elements and wherein:

FIGS. 1A and 1B are lateral cross-sectional views showing mold structure (in a clamped mold state) according to one embodiment of the invention, wherein

FIGS. 2A and 2B are views showing a front bumper (a horned front bumper) having horn portions according to this embodiment of the invention, wherein

FIGS. 6A and 6B are views showing a case where a matching component is a sealing rubber piece, wherein

FIGS. 7A and 7B are views showing a case where the matching component is a radiator support, wherein

FIGS. 8A and 8B show a front bumper (a horned front bumper) having horn portions, wherein

FIGS. 12A and 12B are cross-sectional views showing a part of a horn-portion mold structure of the conventional mold, wherein

DETAILED DESCRIPTION OF EMBODIMENT

Next, an embodiment of the invention will be described.

Figure 2A:
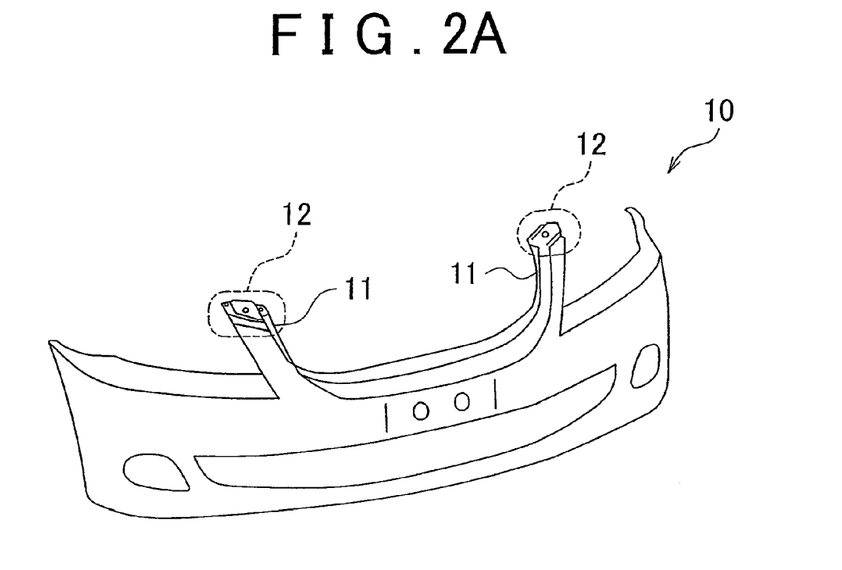
FIG. 2A is a perspective view of the entire front bumper.

A mold structure according to this embodiment of the invention is designed to mold horn portions 11 of a vehicular front bumper 10 (hereinafter referred to as the bumper 10) having "the horn portions" shown in FIG. 2A. More specifically, the mold structure is designed to mold each of vehicle mounting portions 12 (see FIG. 2B) that is provided at the tip of a corresponding one of the horn portions 11 and used to mount the bumper 10 at a predetermined position on the vehicle.

Figure 2B:
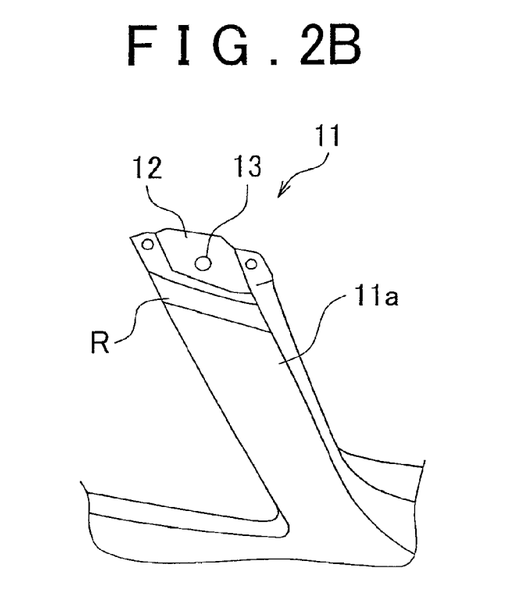
FIG. 2B is a perspective view of the horn portions.

As shown in FIG. 2B, each of the horn portions 11 is composed of a main body portion 11a of the horn portion 11, and the vehicle mounting portions 12 which are provided on the main body portion 11a via a crooked portion R. Further, each of fastening hole 13 for mounting the bumper 10 on the vehicle is formed through a corresponding one of the vehicle mounting portions 12. The fastening holes 13 are undercut portions. It should be noted that the mold structure according to this embodiment of the invention represents one embodiment of the invention and is not particularly limited to the application to the molding of the bumper. The mold structure according to the invention is widely applicable to any mold structure used in molding a resin molded object where a parting line appears through an undercut treatment.

Figure 1A:
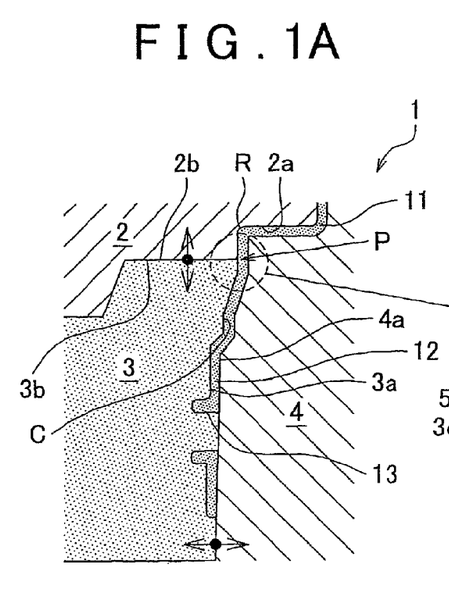
FIG. 1A is a lateral cross-sectional view that shows the structure of the mold structure in near the vehicle mounting portion.

Next, the mold structure according to this embodiment of the invention will be described using FIGS. 1A and 1B. A mold 1 is designed to mold the vehicle mounting portion 12 of each of the horn portions 11 as a molded object having an undercut portion. As shown in FIG. 1A, the mold 1 includes a fixed mold 2, which serves as a first mold, a slide core 3, and a movable mold 4, which serves as a second mold.

The fixed mold 2 has a first molding surface 2a for molding an obverse surface (an outer surface) of the main body portion 11a of each of the horn portions 11 as a molded object. A parting surface 2b as a surface abutting on the upper surface of the slide core 3 is formed on a lower surface of the fixed mold 2. Further, an angular pin (not shown) is arranged diagonally leftward and downward on the fixed mold 2. The angular pin is slidably inserted into a pin hole (not shown) that penetrates the slide core 3 diagonally leftward and downward.

The slide core 3 is a mold that includes an undercut molding surface 3a for molding the undercut portion on the obverse surface of each of the horn portions 11 as a molded object, and is slidably arranged on a base platform (not shown) so that the slide core slides in a direction (a left-and-right direction in this embodiment of the invention) that intersects with the direction (an up-and-down direction in this embodiment of the invention) in which the fixed mold 2 and the movable mold 4 are opened/closed. A parting surface 3b, which is part of the surface that abuts on the parting surface 2b, as the lower surface of the fixed mold 2 is formed on an upper surface of the slide core 3. The slide core 3 performs an undercut treatment of pulling out the molded object having the undercut portion from the mold 1 while sliding in the direction that intersects with the direction in which the fixed mold 2 of the mold 1 and the movable mold 4 of the mold 1 are opened/closed, as the fixed mold 2 and the movable mold 4 are opened/closed.

The undercut molding surface 3a is a surface of the slide core 3 faces the movable mold 4, and the surface forming an obverse surface (an outer surface) of each vehicle mounting portion 12 having a corresponding one of the fastening holes 13 as an undercut portion. That is, the undercut molding surface 3a is worked to be formed in a convexo-concave shape corresponding to a peripheral edge portion, an inner portion, and a peripheral portion of each of the fastening holes 13, which protrudes outward from the obverse surface as the undercut portion of the molded object.

The movable mold 4 has a second molding surface 4a that molds the reverse surface (an inner surface) of each of the horn portions 11 as a molded object, and is movably arranged on the base platform (not shown) in a predetermined direction.

The base platform on which the slide core 3 and the movable core 4 are arranged is movable vertically with respect to the fixed mold 2. The slide core 3 and the movable mold 4 may be opened/closed with respect to the fixed mold 2 by moving the base platform vertically.

The fixed mold 2 and the slide core 3 constitute a cavity mold (a concave mold) in a clamped mold state of the mold 1, and the first molding surface 2a of the fixed mold 2 and the undercut molding surface 3a of the slide core 3 form a cavity surface C of the cavity mold. The cavity surface C forms an outer surface of each vehicle mounting portion 12 serving as an exterior surface of a corresponding one of the horn portions 11 as the molded object and the outer surface of the main body portion 11a of each of the horn portions 11. However, the second molding surface 4a of the movable mold 4 faces the cavity surface C of the cavity mold, and forms the reverse surface of each of the horn portions 11, that is, an inner surface of a corresponding one of the vehicle mounting portions 12 and an inner surface of the main body portion 11a of each of the horn portions 11.

Figure 1B:
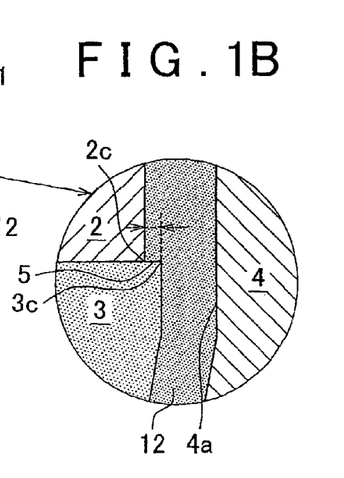
FIG. 1B is a lateral cross-sectional view that shows the structure of the mold structure near a step.

Further, a step 5 is formed on the cavity surface C between the first molding surface 2a and the undercut molding surface 3a at a parting position P (a region indicated by an arrow in FIG. 1A) between the fixed mold 2 and the slide core 3 on the cavity surface C (see FIG. 1B). The step 5 is a region at the parting position P where the slide core 3 protrudes further toward the second molding surface 4a than the fixed mold 2 at the parting position P.

That is, the step 5 has a predetermined clearance (0.2 mm in this embodiment of the invention), which is provided between the edge portion 2c as an end of the parting surface 2b of the fixed mold 2 at a predetermined portion (near the crooked portion R of each of the horn portions 11) of the cavity surface C, composed of the first molding surface 2a of the fixed mold 2 and the undercut molding surface 3a of the slide core 3, and the edge portion 3c as an end of the parting surface 3b of the slide core 3. That is, the step 5 is convex toward the movable mold 4 (the reverse face of the molded object) at the parting position P. The edge portion 3c of the slide core 3 protrudes toward the movable mold 4 from the edge portion 2c of the fixed mold 2 by a predetermined width, and is obtained by extending the aforementioned parting surface 3b of the slide core 3 further toward the second molding surface 4a of the movable mold 4 than the parting surface 2b of the fixed mold 2. Further, because the step 5 is convex toward the movable mold 4 (the reverse face of the molded object), a concave step 15 corresponding to the shape of the step 5 may be formed near the crooked portion R of each of the horn portions 11) on the obverse surface of each of the horn portions 11 as a molded object (see FIG. 4).

With the mold structured as described above, the slide core 3 is guided by the angular pin outward from the mold 1 in the direction intersecting with the direction in which the mold is opened/closed, by vertically moving the base platform on which the slide core 3 and the movable mold 4 are arranged (i.e., by opening/closing the mold). That is, the mold 1 according to this embodiment of the invention is designed to be opened by moving downward the base platform, on which the slide core 3 and the movable mold 4 are arranged. The slide core 3 and the movable mold 4 face each other below the fixed mold 2 with the fixed mold 2 fixed at a predetermined position. In this case, as the base platform on which the slide core 3 and the movable core 4 are arranged moves downward, the slide core 3 slides toward one side (leftward in FIG. 1) of the base platform while the angular pin is pulled out of a pin hole. Thus, the undercut treatment is performed by operating the slide core 3 through the angular pin during the opening/closing movement of the mold 1. It should be noted that the mold may alternatively be opened by moving the fixed mold upward with the movable mold and the slide core, which are arranged below the fixed mold, fixed in position.

Next, a process of molding a molded object according to the mold 1 will be described. As described above, because each of the horn portions 11 includes a corresponding fastening hole 13, the movable mold and the undercut portion interfere with each other so that it may be difficult to remove the molded object from the mold, for example, a mold structure that is composed of a fixed mold and a movable mold, without employing a slide core. In contrast, in the mold 1 employing the slide core 3, the mold opens and the molded object is removed in the following manner after the molded object is formed.

When the mold 1 is clamped, as shown in FIG. 1A, a cavity as a material-filled space formed by the first molding surface 2a and the undercut molding surface 3a as the aforementioned cavity surface C and the second molding surface 4a is filled through injection with a molding material such as resin or the like to mold each of the horn portions 11 as the molded object. After the horn portions have been molded, while the base platform on which the slide core 3 and the movable mold 4 are arranged is moved downward to open the mold 1, the slide core 3 is moved leftward in FIG. 1 by the angular pin to perform the undercut treatment. In this manner, each of the horn portions 11 is released upward from the movable mold 4.

Next, each of the horn portions 11 of the bumper 10 molded according to the mold 1 will be described using FIGS. 2A and 2B. Each of the horn portions 11 shown in FIGS. 2A and 2B protrudes upward from the main body of the bumper 10 as a molded object molded according to the mold 1. As shown in FIG. 2B, the crooked portion R is formed on each horn portions 11 at a longitudinally middle portion thereof. Each of the horn portions 11 is composed of the main body portion 11a and a vehicle mounting portion 12 that extends from the main body portion 11a via the crooked portion R.

Figure 3:
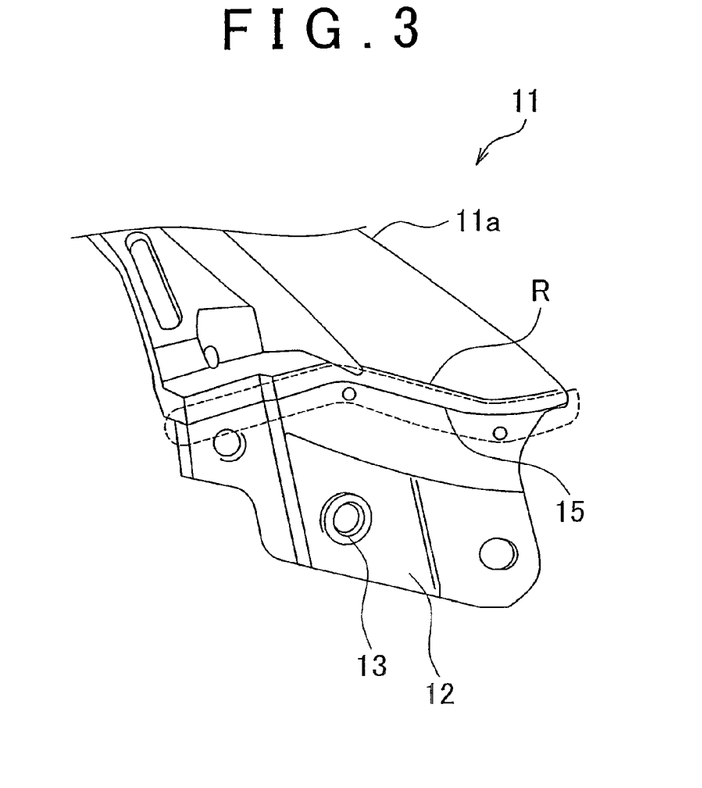
FIG. 3 is a perspective view showing each of the horn portions having the step (a concave portion)

Each vehicle mounting portion 12 may be mounted on the vehicle by being engaged with a radiator support, a front upper grill or the like as a matching component to which each vehicle mounting portion 12 is mounted. A plurality of the fastening holes 13 that penetrate the vehicle mounting portions 12 are formed in each vehicle mounting portion 12. A reverse surface (an inner surface) of each vehicle mounting portion 12 near a corresponding one of the fastening holes 13 is a substantially flat surface, and the outer surface of each vehicle mounting portion 12 near the corresponding fastening hole 13 is shaped so that the peripheral edge of the corresponding fastening hole 13 protrudes outward. Furthermore, each vehicle mounting portion 12 has, in the vicinity of the crooked portion R, the concave step 15 formed in a manner corresponding to the step 5 of the mold 1 such that a predetermined clearance is formed between the step 15 and the crooked portion R as shown in FIG. 3.

Figure 4:
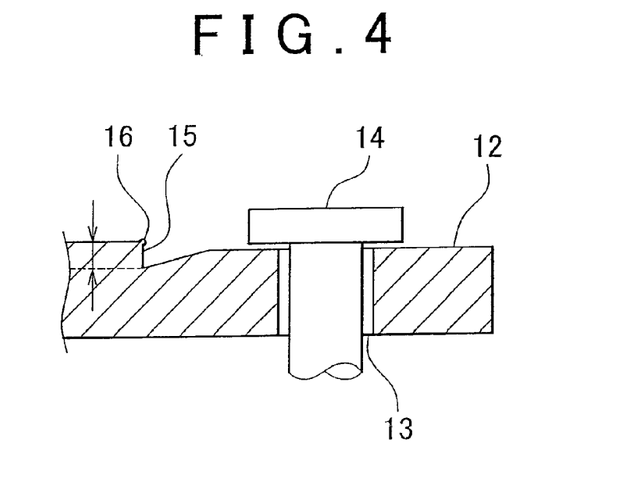
FIG. 4 is a schematic cross-sectional view showing the shape of the step (the concave portion)

On the step 15, the parting line 16 is formed along the edge of the step 15, which is a region that corresponds to the parting position P between the fixed mold 2 and the slide core 3 as shown in FIG. 4.

As described above, the parting line 16 is formed on the edge of the step 15 on the molded object side by forming the step 5 between the first molding, surface 2a and the undercut molding surface 3a at the parting position P between the fixed mold 2 and the slide core 3 on the cavity surface C. Therefore, the parting line 16 is inconspicuous on the exterior of the molded object. Further, the parting line 16 is inconspicuous even when it appears. Therefore, there is no need to perform the common polish operation on the peripheral portion of the parting position P as in the related art. As a result, operational safety is improved, and the cost of manufacturing the mold may be reduced. Further, the bumper 10 (each of the horn portions 11) as a molded object has the parting line 16 along the edge region of the step 15. Therefore, the parting line is rendered inconspicuous.

As shown in FIG. 4, the step 15 requires a predetermined thickness to ensure a fastening force in each fastening hole 13 for the mounting to the vehicle in fastening a corresponding one of fastening bolts 14 as a shape peculiar to a corresponding one of "the vehicle mounting portions". Therefore, the vehicle mounting portion 12 assumes "a gradually changing shape", in particular, a shape that decreases in depth from a predetermined depth (a deep region indicated by arrows in FIG. 4, 0.2 mm in this embodiment of the invention) toward each of the fastening holes 13.

Figure 5A:
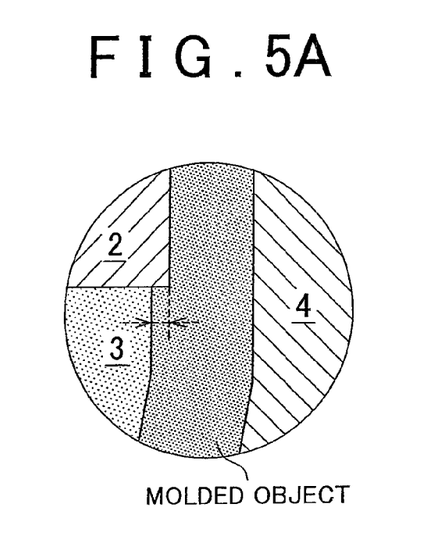
FIG. 5A is a cross-sectional view showing a part of a mold structure with one end of a fixed mold protruding from the end of a slide core.
Figure 5B:
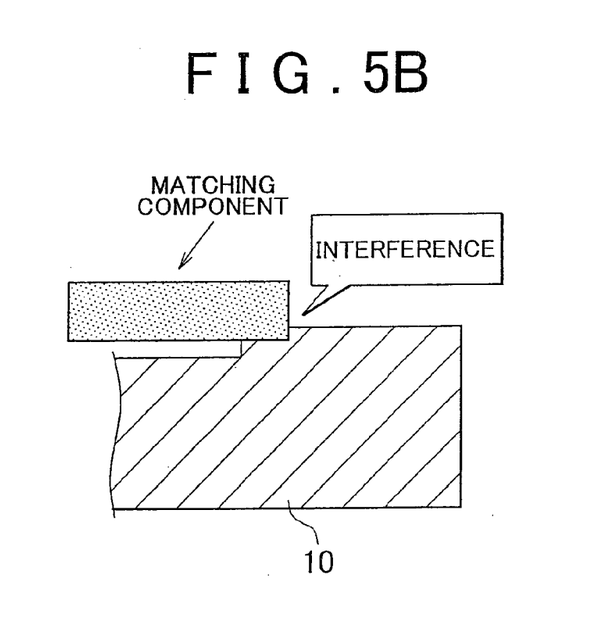
FIG. 5B is a cross-sectional view that shows a molded object molded according to the mold structure.

In this case, the step may be molded on the obverse surface of the molded object, so that the end of the fixed mold 2 protrudes further toward the movable mold 4 side more than the end of the slide core 3 as shown in FIG. 5A, as opposed to the step 5 shown in FIGS. 1A and 1B. In this embodiment of the invention, however, the bumper 10 may interfere with the matching component fastened (engaged) in each of the fastening holes 13. Therefore, the end of the slide core 3 is convex on the movable mold 4 side (on the reverse surface of the molded object). In this manner, the step 15 on the obverse surface of the molded object formed by the step 5 is concave. Therefore, even if the matching component becomes contiguous to this concave step 15, they do not interfere with each other. It should be noted that the configuration shown in FIG. 5 is also possible as long as the molded object does not to interfere with the matching component in terms of design.

Figure 6A:
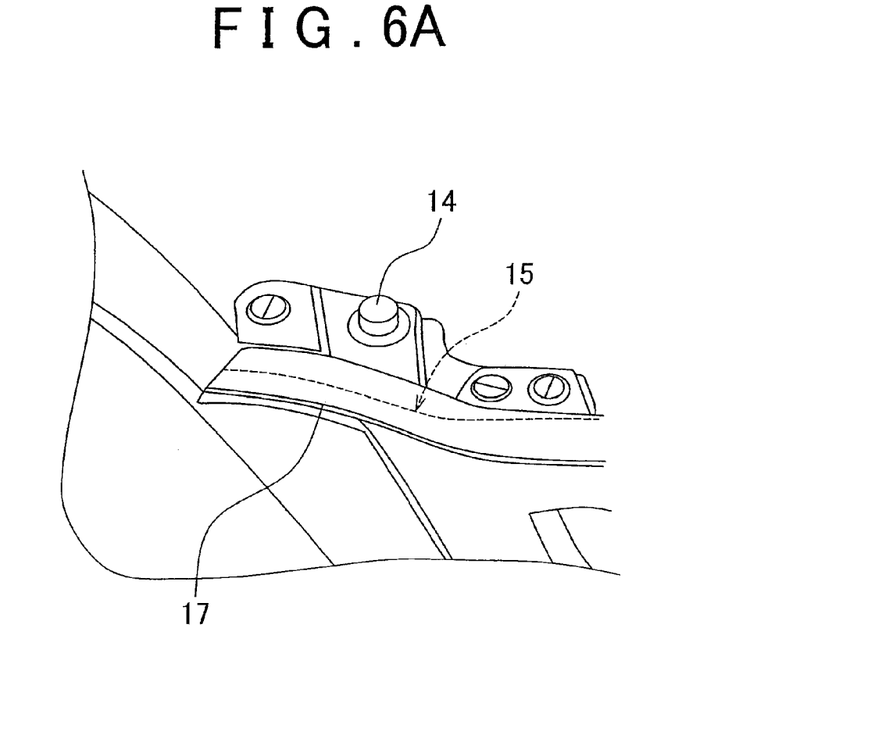
FIG. 6A is a perspective view and FIG. 6B is a schematic cross-sectional view.
Figure 6B:
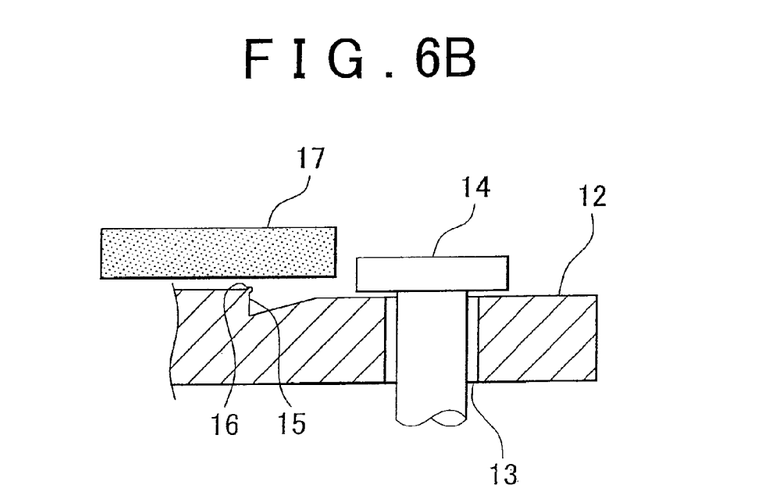
Figure 7A:
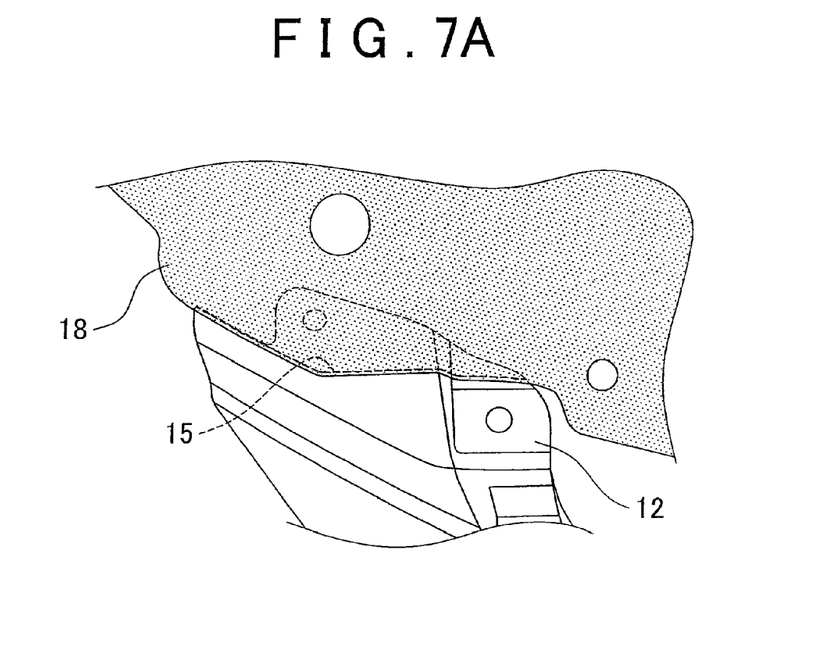
FIG. 7A is a plan view and FIG. 7B is a schematic cross-sectional view.
Figure 7B:
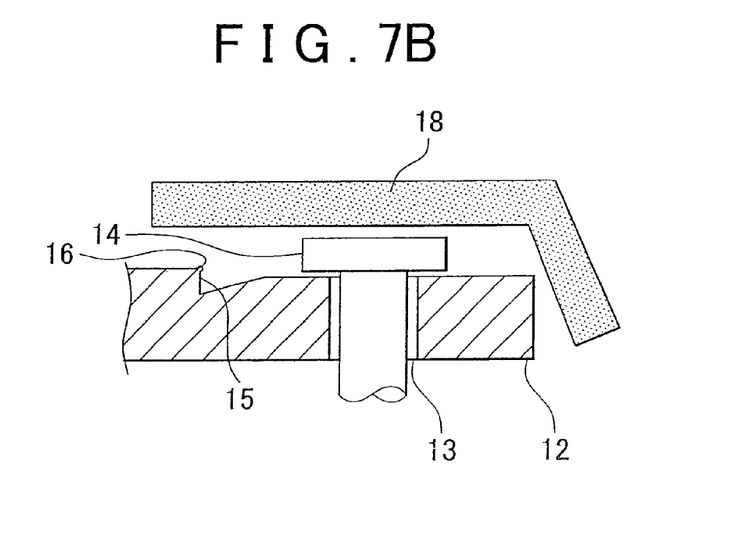

Next, FIGS. 6 and 7 show the bumper 10 (the horn portions 11) when mounted on the vehicle. As shown in FIG. 3, the bumper 10 according to this embodiment of the invention is provided, at the vehicle mounting portion 12 of horn portions 11, with the step 15 located at a position where it is concealed by the matching component through engagement therewith. In this case, FIG. 6 shows the use of a sealing rubber piece 17 as the matching component, and FIG. 7 shows the use of a radiator support 18 as the matching component. As shown in FIGS. 6 and 7, the step 15 having the parting line 16 is located below the sealing rubber piece 17 or the radiator support 18 serving as the matching component. Thus, the parting line 16 may be concealed with the aid of the matching component, such as the sealing rubber piece 17, the radiator support 18 or the like. Therefore, no blinder member is required.

As described above, in the mold structure according to this embodiment of the invention, the slide core 3 is convex at the parting position P where the parting line 16 appears. Thus, the common polish working causing concern in terms of operational safety and the like is abolished, and there is no need to modify the mold either for reasons of aging. As a result, the operational safety is improved, and the cost of manufacturing the mold may be reduced. That is, the quality of the exterior of the molded object produced by the mold 1 may be improved. Therefore, there is no need to perform additional operations such as polishing the mold to ensure the exterior quality. As a result, the man-hours required to operate the mold may be reduced.

Further, even if a gap is created between the slide core 3 and the fixed mold 2 due to a mold working error, displacement of the slide core 3 resulting from an injection molding pressure, the generation of "settling" and "droop" resulting from aging, and the like, the step 15 on a product slightly changes in height and shape, but there is no "parting line protruding on the flat surface" as shown in FIG. 10. Therefore, the parting line 16 is inconspicuous.

Furthermore, in the mold structure according to this embodiment of the invention, the board thickness of the molded object can be set (adjusted) on the slide core 3 side, which is smaller in size and better in workability than the movable mold 4, by setting the reverse surface of each vehicle mounting portion as the parting position between the slide core 3 and the movable mold 4 as a working reference, namely, setting the undercut molding surface 3a of the slide core 3 as a reference for convexo-concave working rather than subjecting the second molding surface 4a of the movable mold 4 to convexo-concave working. That is, in the conventional mold structure shown in FIG. 10, the obverse surface of each vehicle-mounting portion is set as a working reference, and hence the movable mold is worked. It is difficult to work the movable mold because of its large size. Thus, "the operation of mating" the movable mold 4 with the slide core 3 with each other is also facilitated in building up the mold.

Further, the parting line 16 may be formed at the edge portion of the step (the concave portion), as in this embodiment of the invention, to thereby render it inconspicuous. In addition, the step 15 may also be concealed by the matching component by adjusting the positional relationship with the matching component. Therefore, the parting line 16 is made invisible. Thus, an improvement in aesthetic quality is made when a front hood is open.

In this embodiment of the invention, the bumper 10 is mounted by engaging with the matching component (the radiator support/the front upper grill or the like), and the parting position P (=a parting line appearance position) of the mold is provided a position so that it is concealed by the matching component when the bumper 10 is engaged with the matching component. The position at which the parting line appears is designed as the step (the concave portion) 5.

In this embodiment of the invention, the bumper mold structure includes the fixed mold 2 used to mold the obverse surface of the molded object, the movable mold 4 used to mold the reverse surface of the molded object, and the slide core 3 used to mold the obverse surface of the molded object together with the fixed mold 2 and to form each fastening hole 13 of the molded object serving as the undercut portions in opening the fixed mold 2/the movable mold 4. The slide core 3 is convex on the movable mold 4 side (the reverse surface of the molded object) at the mold parting position P of the fixed mold 2/the slide core 3.

The invention claimed is:

1. A mold structure for molding a molded object having an undercut portion, comprising:
   a first mold having a first molding surface configured to mold an obverse surface of the molded object, and a first parting surface connecting with the first molding surface via a first edge portion;
   a slide core having an undercut molding surface and a second parting surface, the undercut molding surface being configured to mold the undercut portion as part of the obverse surface of the molded object, the second parting surface connecting with the undercut molding surface via a second edge portion; and
   a second mold having a second molding surface configured to mold a reverse surface of the molded object,
   wherein the first molding surface and the undercut molding surface form a cavity surface,
   the slide core is configured to move in a direction that intersects with a direction in which the first mold and the second mold are opened,
   the second parting surface abuts on the first parting surface in a clamped mold state of the mold structure,
   in the clamped mold state of the mold structure, the slide core protrudes further than the first mold, toward the second molding surface and is configured to form a concave step of the molded object,
   the first mold and the slide core are configured to form a parting line of the concave step of the molded object at the first edge portion, and
   the mold structure is configured to mold the molded object so that the parting line of the concave step of the molded object is located below a matching component to be concealed with the aid of the matching component.

2. A bumper mounted by being engaged with a matching component, comprising:
   an obverse surface; and
   a concave step formed at a predetermined position of the obverse surface, the concave step of the bumper having a parting line along an edge portion of the concave step, the parting line protruding along the edge portion,
   wherein the parting line of the concave step of the bumper is set at a position so that it is concealed by the matching component when the matching component is engaged with the bumper.

* * * * *